United States Patent [19]

Burhans, Jr. et al.

[11] Patent Number: 5,542,625
[45] Date of Patent: Aug. 6, 1996

[54] GULL WING AIRCRAFT

[75] Inventors: Walter R. Burhans, Jr., Miller Place, N.Y.; Nathan Kirchbaum, Blacksburg, Va.; Richard F. Nastasi, Commack, N.Y.

[73] Assignee: Grumman Aerospace Corporation, Bethpage, N.Y.

[21] Appl. No.: 37,333

[22] Filed: Mar. 26, 1993

[51] Int. Cl.$^6$ .................... B64C 3/16; B64C 5/04
[52] U.S. Cl. .................. 244/45 R; 244/45 A; 244/89
[58] Field of Search ................. 244/45 R, 45 A, 244/36, 75 R, 13, 15, 89

[56] References Cited

U.S. PATENT DOCUMENTS

| | | | |
|---|---|---|---|
| 3,954,231 | 5/1976 | Fraser | 244/85 A |
| 4,116,405 | 9/1978 | Bacchi et al. | 244/45 R |
| 4,365,773 | 12/1982 | Wolkovitch | 244/45 R |
| 4,417,708 | 11/1983 | Negri | 244/45 R |
| 5,224,665 | 7/1993 | Goldsberry et al. | 244/75 R |

FOREIGN PATENT DOCUMENTS

| | | | |
|---|---|---|---|
| 577495 | 9/1924 | France | 244/45 R |
| 620149 | 4/1927 | France | 244/45 R |

OTHER PUBLICATIONS

Heincke, PCT Publication WO 84/01926 May 1984.
Hall, PCT Publication WO 88/06551 Sep. 1988.

*Primary Examiner*—Galen L. Barefoot
*Attorney, Agent, or Firm*—Scully, Scott, Murphy & Presser

[57] ABSTRACT

A vehicle, lacking an empennage, has a gull wing with ailerons movably mounted at the trailing edges of the wing for controlling pitch, yaw and roll, or has a wing and a gull tail with flaps movably mounted at the trailing edges of the tail surface for controlling pitch, yaw and roll.

9 Claims, 6 Drawing Sheets

GULL WING AIRCRAFT

BACKGROUND OF THE INVENTION

The present invention relates to a gull wing aircraft. More particularly, the invention relates to an aircraft having a gull wing and lacking an empennage.

An aircraft lacking an empennage is lighter in weight than one having an empennage and is thus useful in many applications where the weight saving would be of great value. An aircraft lacking an empennage, more specifically, a vertical stabilizer however, has a great problem of providing adequate directional stability and control. The only type of aircraft which can achieve such stability and control is a flying wing. If a flying wing is properly designed, it can provide neutral directional stability, using camber and twist and directional control with split wing tip flaps. Such a design imposes a severe limit on the maneuverability of the aircraft, especially directionally and laterally, and requires a large span wing.

The principal object of the invention is to provide a vehicle devoid of an empennage, but having adequate directional stability and control.

An object of the invention is to provide an aircraft devoid of an empennage, but of simple structure, which aircraft has stability and control in all three axes, including directional.

Another object of the invention is to provide a gull wing aircraft having a weight saving and having stability and control in all three axes.

Still another object of the invention is to provide a gull wing aircraft, lacking an empennage, but having fully adequate directional stability and control.

Yet another object of the invention is to provide a gull wing vehicle, lacking an empennage, which aircraft provides positive directional stability for changes in aircraft sideslip due to changes in the local angle of attack on the wing surfaces.

Another object of the invention is to provide an aircraft, lacking an empennage, which aircraft provides positive directional stability for increase or decrease in lift due to the sweep angle of the wing.

Still another object of the invention is to provide a vehicle devoid of an empennage, but having a directionally stable, or near directionally stable, platform.

BRIEF SUMMARY OF THE INVENTION

In accordance with the invention, control means mounted on the wing at the trailing edges thereof control pitch, yaw and roll. The control means comprise ailerons and the wing comprises a pair of wing sections extending from opposite sides of the fuselage at an angle with a horizontal plane. Each of the sections is bent intermediate its length to form an inboard part and an outboard part in the shape of one of a substantial "V" and an inverted substantial "V". Both of the inboard parts are bent in substantially the same direction at substantially the same angle and both of the outboard parts are bent in substantially the same direction at substantially the same angle. Variations in inboard and outboard cant angle may be used to provide the proper blend of stability and control. Additionally, the concept is viable with or without a canard or as a horizontal or vertical tail with a conventional or unconventional wing.

The inboard part of each of the wing sections forms a dihedral angle with the fuselage and the outboard part of each of the wing sections forms an anhedral angle with the inboard part, or, alternatively, the inboard part of each of the wing sections forms an anhedral angle with the fuselage and the outboard part of each of the wing sections forms a dihedral angle with the inboard part.

In accordance with the invention, an aircraft having a fuselage with a forward end and a spaced opposite aft end comprises a gull wing on the fuselage having leading and trailing edges. A gull tail is also on the fuselage, at the aft end. A canard may be provided on the fuselage forward of the leading edges of the wing, dependent upon the desired function of the aircraft. Ailerons mounted on the wing at the trailing edges thereof control pitch, yaw and roll.

The wing may be forward swept, having forward swept leading edges and forward swept trailing edges, or it may be rear swept, having rear swept leading edges and rear swept trailing edges, or it may have a combination of forward and aft swept edges.

In accordance with the invention, a vehicle having a fuselage with a forward end and a spaced opposite aft end comprises a wing on the fuselage. A gull tail is provided on the fuselage. The tail has leading and trailing edges. Control means is mounted on the tail at the trailing edges thereof for controlling pitch, yaw and roll or the entire tail may be rotated providing pitch, yaw and roll.

The wing comprises a pair of wing sections extending from opposite sides of the fuselage at an angle with a horizontal plane and the tail comprises a pair of tail sections extending from opposite sides of the fuselage at an angle with a horizontal plane. Each of the wing sections and the tail sections is bent intermediate its length to form an inboard part and an outboard part in the shape of one of a substantial "V" and an inverted substantial "V" and one of an inverted substantial "V" and a substantial "V". Both of the inboard parts and both of the outboard parts are bent substantially in the same direction at substantially the same angle.

The inboard part and outboard part of each of the wing sections and the tail sections form a dihedral angle, or the inboard part and outboard part of each of the wing sections and the tail sections form an anhedral angle. The angle is determined by the desired amount of stability and control in each of the horizontal and vertical axes.

The control means comprise flaps and the tail surface comprises a pair of tail sections extending from opposite sides of the fuselage at an angle with a horizontal plane. Each of the sections is bent intermediate its length to form an inboard part and an outboard part in the shape of a substantial "V" and an inverted substantial "V". Both of the inboard parts are bent in substantially the same direction at substantially the same angle and both of the outboard parts are bent in substantially the same direction at substantially the same angle.

In accordance with the invention, a method of controlling a vehicle having a fuselage with a forward end and a spaced opposite aft end comprises the steps of forming one of a gull wing with trailing edges and a gull tail with trailing edges, affixing one of the gull wing and the gull tail to the fuselage, and mounting control on one of the wing and tail affixed to the fuselage at the trailing edges thereof for controlling pitch, yaw and roll.

The gull wing is formed by forming a pair of wing sections, bending each of the sections intermediate its length to form an inboard part and an outboard part in the shape of one of a substantial "V" and an inverted substantial "V", bending both of the inboard parts and both of the outboard parts in substantially the same direction at substantially the same angle, bending both of the outboard parts in substantially the same direction at substantially the same angle and affixing the sections to opposite sides of the fuselage at an angle with a horizontal plane.

The gull tail is formed by forming a pair of tail sections, bending each of the sections intermediate its length to form an inboard part and an outboard part in the shape of a substantial "V" and an inverted substantial "V", bending both of the sections in substantially the same direction at substantially the same angle and affixing the sections to opposite sides of the fuselage at an angle with a horizontal plane.

The control surfaces are mounted by movably mounting a first control surface to the wing at the trailing edge of the inboard part of one of the wing sections, movably mounting a surface to the wing at the trailing edge of the outboard part of the one of the wing sections, movably mounting a third control surface to the wing at the trailing edge of the inboard part of the other of the wing sections and movably mounting a fourth control surface to the wing at the trailing edge of the outboard part of the other of the wing sections, whereby when the first, second, third and fourth control surfaces are moved down, lift forces produced thereby add and side forces produced thereby cancel, thereby producing pure pitch.

The control surfaces are mounted by movably mounting a first control surface to the wing at the trailing edge of the inboard part of one of the wing sections, movably mounting a second control surface to the wing at the trailing edge of the outboard part of the one of the wing sections, movably mounting a third control surface to the wing at the trailing edge of the inboard part of the other of the wing sections and movably mounting a fourth control surface to the wing at the trailing edge of the outboard part of the other of the wing sections whereby when the first and second control surfaces are moved down and the third and fourth control surfaces are moved up, lift forces produced by the first and second control surfaces add, contralift forces produced by the third and fourth control surfaces add and side forces produced by the first, second, third and fourth control surfaces cancel thereby producing pure roll.

The control surfaces are mounted by movably mounting a first control surface to the wing at the trailing edge of the inboard part of one of the wing sections, movably mounting a second control surface to the wing at the trailing edge of the outboard part of the one of the wing sections, movably mounting a third control surface to the wing at the trailing edge of the inboard part of the other of the wing sections and movably mounting a fourth control surface to the wing at the trailing edge of the outboard part of the other of the wing sections whereby when the first and stet control surfaces are moved up and the second and stet control surfaces are moved down, side forces produced by the first, second, third and fourth control surfaces add, lift forces produced by the stet control surface are cancelled by forces produced by the stet control surface and lift forces produced by the stet control surface are cancelled by forces produced by the stet control surface, thereby producing pure yaw.

BRIEF DESCRIPTION OF THE DRAWINGS

In order that the invention may be readily carried into effect, it will now be described with reference to the accompanying drawings, wherein.

DETAILED DESCRIPTION OF A PREFERRED EMBODIMENT

The vehicle of the invention has a fuselage 1 with a forward end or nose 2 and a spaced opposite aft end 3 (FIGS. 1 to 3 and 5 to 7). The vehicle may be an aircraft, a sea craft, or other type of vehicle. In accordance with the invention, the aircraft also has a gull tail, as hereinafter described. The aircraft has no conventional empennage. A gull wing is provided on the fuselage 1 and extends from opposite sides of the aft end 3 of said fuselage. In the first embodiment of FIGS. 1 to 4, the wing 4 is a forward swept gull wing, as illustrated, and in the second embodiment of FIGS. 5 to 8, the wing 5 is a rear swept gull wing, as shown.

Each of the wings has leading edges and trailing edges. Thus, the wing 4 (FIGS. 1 to 4) has forward swept leading edges 6 to 7 and forward swept trailing edges 8 and 9 (FIG. 3) and the wing 5 (FIGS. 5 to 8) has rear swept leading edges 10 and 11 and rear swept trailing edges 12 and 13 (FIG. 7).

Figure 1:
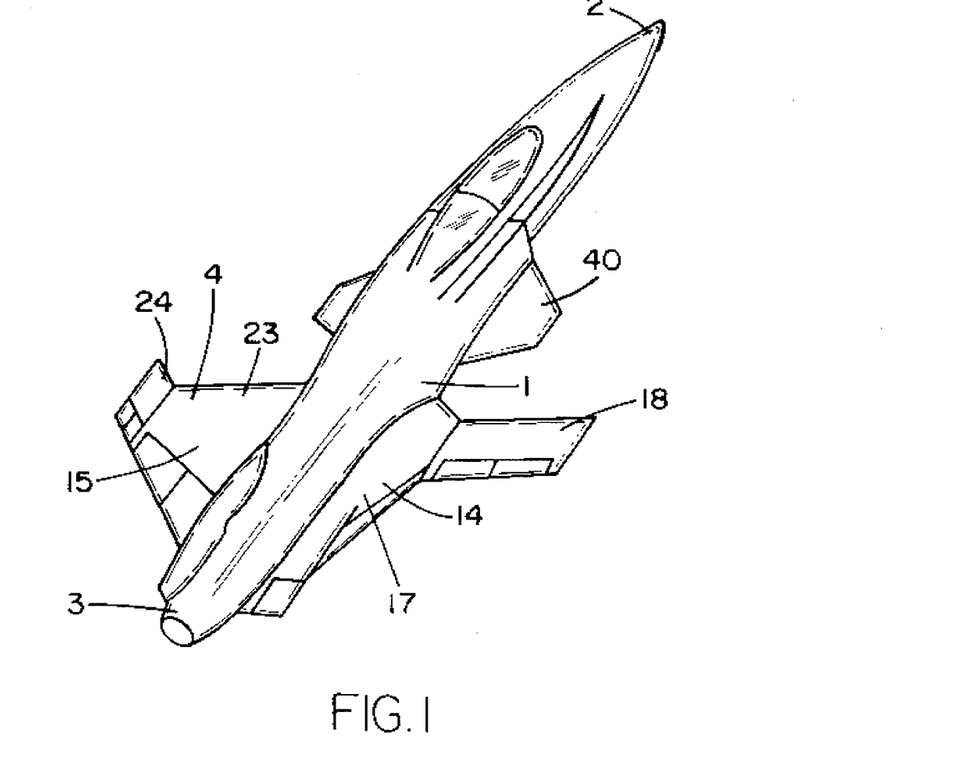
FIG. 1 is a perspective view of a forward swept wing embodiment of the gull wing aircraft of the invention.
Figure 2:
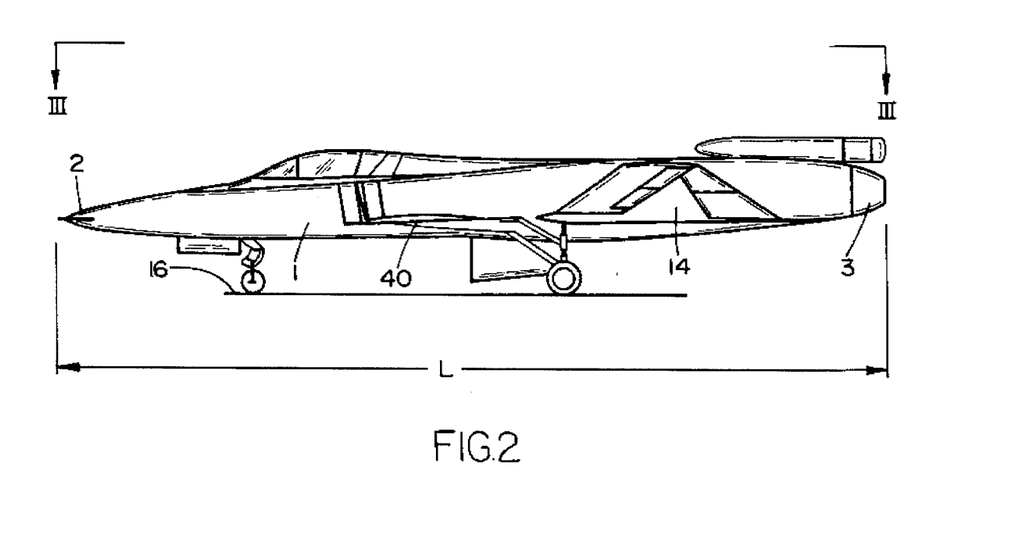
FIG. 2 is a side view of the embodiment of FIG. 1.
Figure 3:
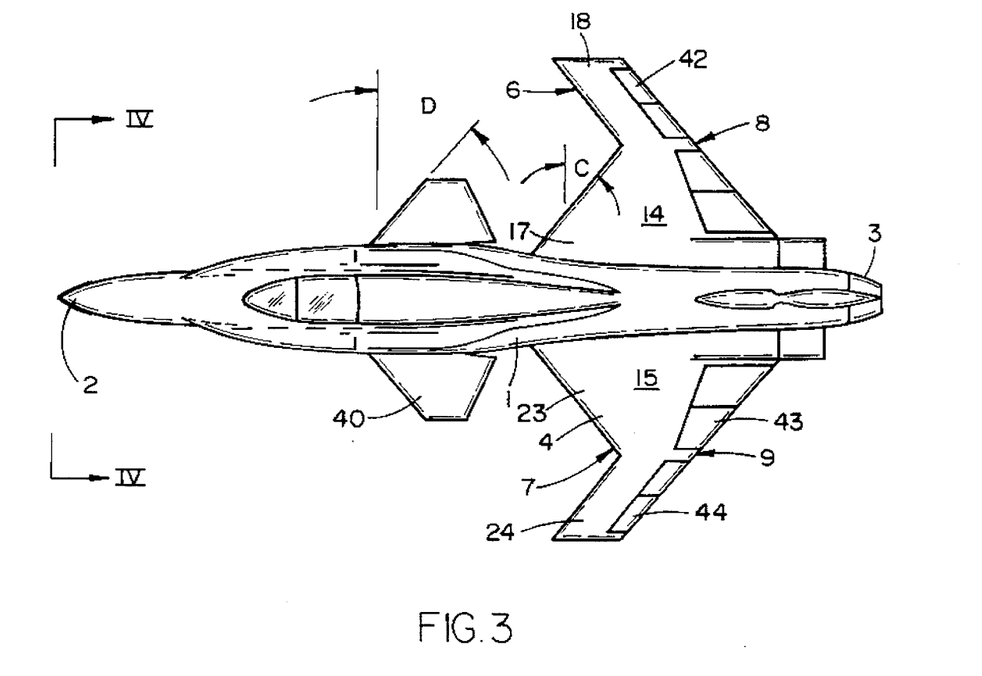
FIG. 3 is a top plan of the embodiment of FIG. 1, taken along the lines III—III of FIG. 2.
Figure 4:
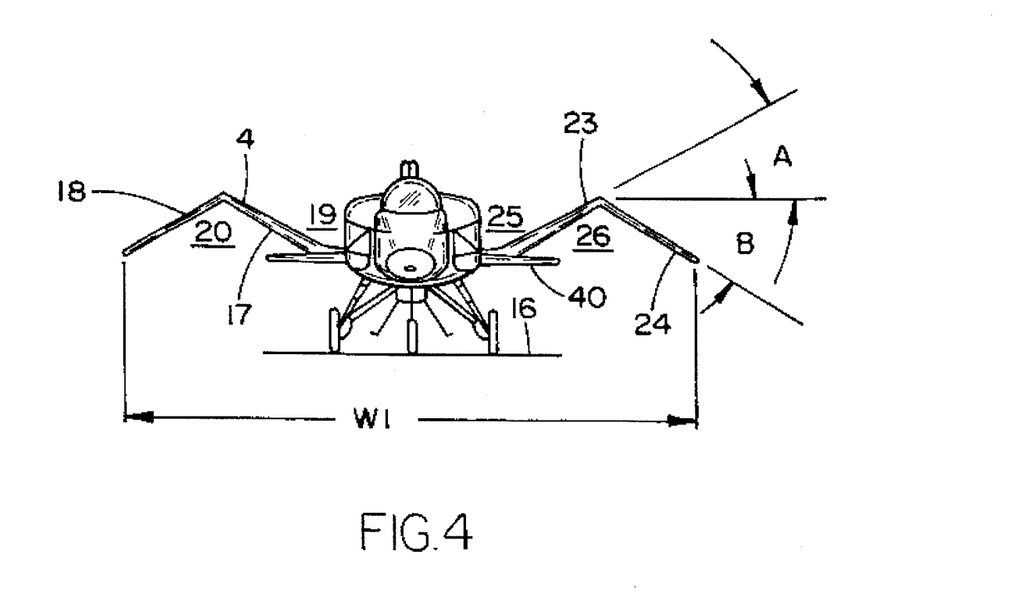
FIG. 4 is a front view of the embodiment of FIG. 1, taken along the lines IV—IV of FIG. 3.

Each of the wings comprises a pair of wing sections extending from opposite sides of the fuselage 1 at an angle with a horizontal plane and each of the wing sections is bent intermediate its length to form an inboard part and an outboard part in the shape of either a substantial "V" and an inverted substantial "V", or in the shape of an inverted substantial "V" and a substantial "V". Both of the inboard parts are bent in substantially the same direction at substantially the same angle and both outboard parts are bent in substantially the same direction at substantially the same angle. Thus, the wing 4 of FIGS. 1 to 4 comprises a pair of wing sections 14 and 15 (FIGS. 1 to 3) extending from opposite sides of the fuselage 1 at an angle with a horizontal plane 16 (FIGS. 2 and 4). The wing section 14 is bent intermediate its length to form an inboard part 17 and an outboard part 18, as shown in FIGS. 1, 3 and 4, in the shape of a substantial "V" 19 (FIG. 4) and an inverted substantial "V" 20 (FIG. 4), respectively. The inboard part 17 and outboard part 18 thus form a dihedral angle 20 (FIG. 4). Alternatively, the inboard part 17 and the outboard part 18 may shape an inverted substantial "V" 21 and a substantial "V" 22 (FIG. 10), respectively, thereby forming an anhedral angle 22 (FIG. 10).

The wing section 15 is bent intermediate its length to form an inboard part 23 and an outboard part 24, as shown in FIGS. 1, 3 and 4, in the shape of a substantial "V" (FIG. 4) and an inverted substantial "V" 26 (FIG. 4), respectively. The inboard part 23 and outboard part 24 thus form a dihedral angle 25 (FIG. 4). Alternatively, the inboard part 23 and the output part 24 may shape an inverted "v" 27 and a substantial "V" 28 (FIG. 10), respectively, thereby forming an anhedral angle 28 (FIG. 10). The inboard parts 17 and 23 of the wing sections 14 and 15, respectively, are bent in the same direction at the same angle A (FIG. 4) with the horizontal plane 16. The outboard parts 18 and 24 of the wing sections 14 and 15, respectively, are bent in the same direction at the same angle B with the horizontal plane (FIG. 4).

Figure 5:
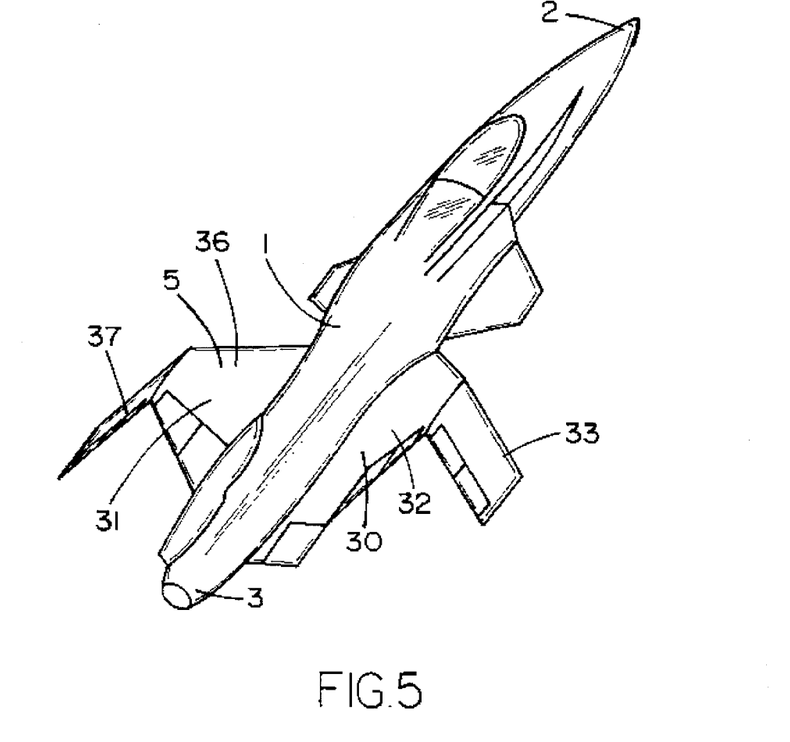
FIG. 5 is a perspective view of a rear swept wing embodiment of the gull wing aircraft of the invention.
Figure 6:
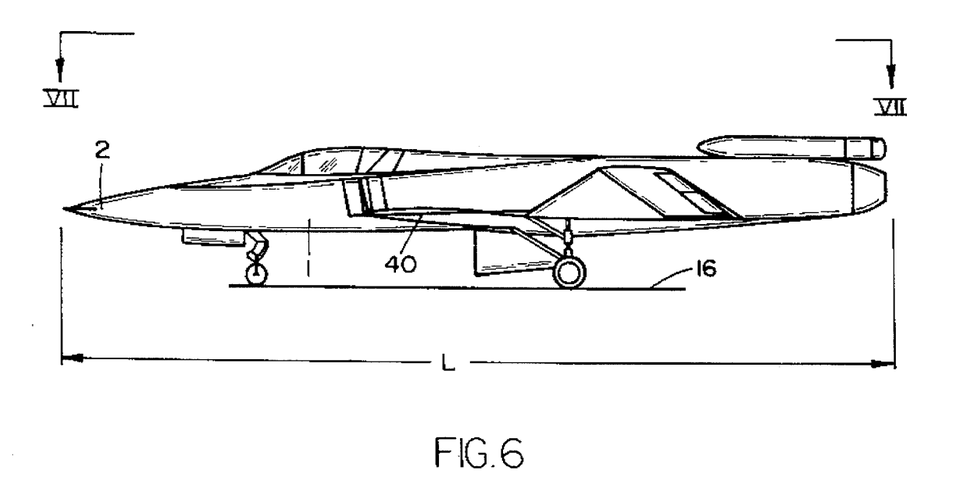
FIG. 6 is a side view of the embodiment of FIG. 5.
Figure 7:
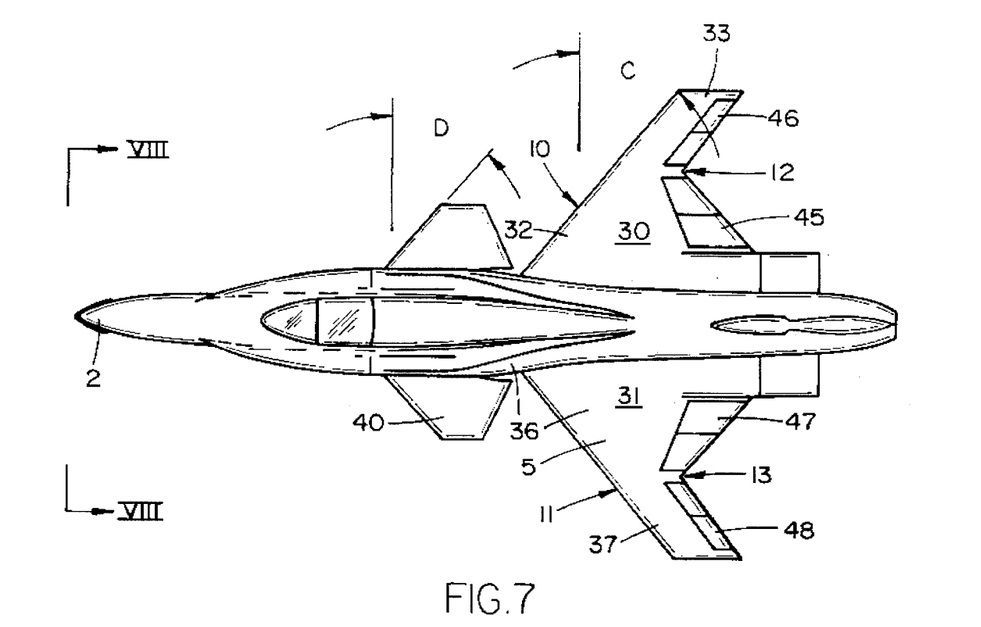
FIG. 7 is a top plan of the embodiment of FIG. 5, taken along the lines VII—VII of FIG. 6.
Figure 8:
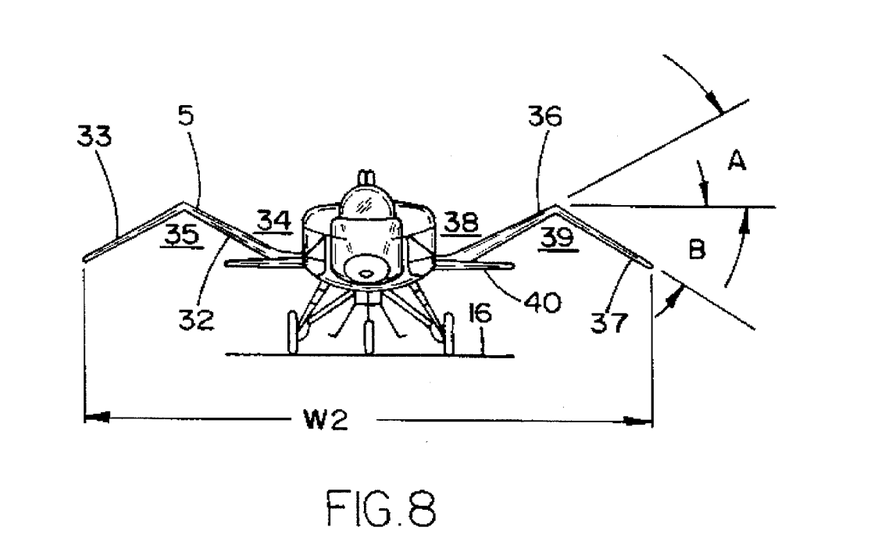
FIG. 8 is a front view of the embodiment of FIG. 5, taken along the lines VIII—VIII of FIG. 7.

The wing 5 of FIGS. 5 to 8 comprises a pair of wing sections 30 and 31 (FIGS. 5 and 7) extending from opposite sides of the fuselage 1 at an angle with a horizontal plane 16 (FIGS. 6 and 8). The wing section 30 is bent intermediate its length to form an inboard part 32 and an outboard part 33, as shown in FIGS. 5, 7 and 8, in the shape of a substantial "V" 34 (FIG. 8) and in inverted substantial "V" 35 (FIG. 8), respectively. The inboard part 32 and outboard part 33 thus form a dihedral angle 35 (FIG. 8). Alternatively, the inboard part 32 and the outboard part 33 may shape the inverted substantial "V" 21 and the substantial "V" 22 (FIG. 10), respectively, thereby forming the anhedral angle 22 (FIG. 10).

The wing section 31 is bent intermediate its length to form an inboard part 36 and an outboard part 37, as shown in FIGS. 5, 7 and 8, in the shape of a substantial "V" 38 (FIG. 8) and an inverted substantial "V" 39 (FIG. 8), respectively. The inboard part 36 and outboard part 37 thus form a dihedral angle 38 (FIG. 8). Alternatively, the inboard part 36 and the output part 37 may shape the inverted "V" 27 and the substantial "V" 28 (FIG. 10), respectively, thereby forming the anhedral angle 28 (FIG. 10). The inboard parts 32 and 36 of the sections 30 and 31, respectively, are bent in the same direction at the same angle A (FIG. 8) with the horizontal plane 16. The outboard parts 33 and 37 of the wing sections 30 and 31, respectively, are bent in the same direction at the same angle B (FIG. 8). The angles A and B are determined by the requirements for longitudinal and directional stability and control.

The aircraft of the invention may have a canard 40 of any suitable known type on the fuselage 1. The canard 40 is usually forward of the leading edges 6 and 7 of the wing 4 (FIGS. 1 and 3) and forward of the leading edges 10 and 11 of the wing 5 (FIGS. 5 and 7). The canard 40 is not part of the invention, as such.

Ailerons, flaps, or control surfaces are movably mounted on the wings 4 and 5 at the trailing edges 8 and 9 and 12 and 13, respectively, thereof for controlling pitch, yaw and roll, thereby providing directional stability and control. Thus, ailerons 41 and 42 are mounted at the trailing edges of the inboard and outboard parts 17 and 18, respectively, of the wing section 14 and ailerons 43 and 44 are movably mounted at the trailing edges of the inboard and outboard parts 23 and 24, respectively, of the wing section 15, as shown in FIG. 3. Ailerons 45 and 46 are mounted at the trailing edges of the inboard and outboard parts 32 and 33, respectively, of the wing section 30 and ailerons 47 and 48 are mounted at the trailing edges of the inboard and outboard parts 36 and 37, respectively, of the wing section 31, as shown in FIG. 7.

The wings 4 and 5 of the illustrated embodiments have dihedral, or upward slanting, inboard parts 17 and 23 (FIG. 4) and 32 and 36 (FIG. 8), respectively (FIGS. 9A, 9B and 9C), extending from opposite sides of the fuselage 1 and anhedral, or downward slanting, outboard parts 18 and 24 (FIG. 4) and 33 and 37 (FIG. 8), respectively (FIGS. 9A, 9B an 9C), extending from the free ends of said dihedral wing surfaces. This may be reversed, as shown in FIG. 10 for the gull wing and in FIG. 12 for the gull tail, so that the inboard parts 17 and 23 and 32 and 36 are anhedral and the outboard parts 18 and 24 and 33 and 37 are dihedral. This structure produces a restoring moment, or positive directional stability, for changes in aircraft slideslip due to changes in the local angle of attack on the lifting surfaces and the increase or decrease in lift due to the sweep angle. With the base platform being thus made directionally stable, or near directionally stable, more than sufficient three axis control can be obtained by proper operation of the control surfaces.

A gull tail 60 is provided on the fuselage 1, as shown in FIG. 11, wherein a horizontal plane 61 is shown. The gull tail 60 is bent in the same manner as the gull wings of FIGS. 4 and 8. A modified gull tail 62 is shown in FIG. 12, said modified gull tail being bent in the same manner as the gull wing of FIG. 10.

Figure 13:
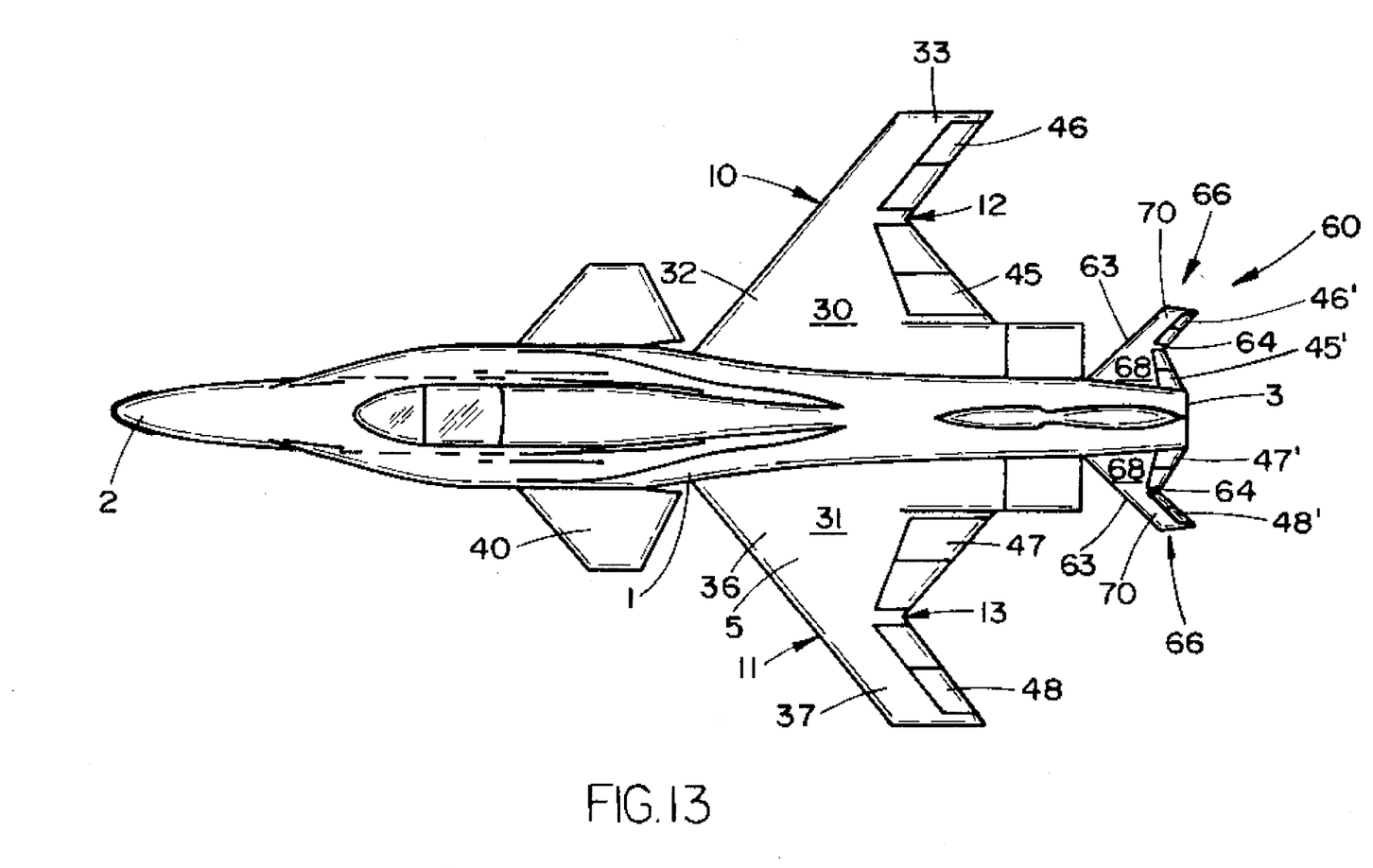
FIG. 13 is a view similar to FIG. 7 having the gull tail of FIG. 11 added thereto.

Referring to FIGS. 11 and 13, a gull tail 60 is provided on the fuselage. The tail surface has leading and trailing edges, respectively 63, 64. Control means is mounted on the tail surface at the trailing edges thereof for controlling pitch, yaw and roll or the entire tail surface may be rotated providing pitch, yaw and roll.

Figure 9A:
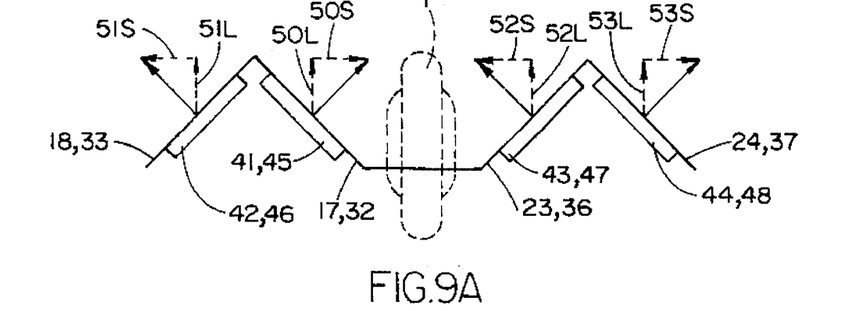
FIGS. 9A, 9B and 9C are schematic diagrams illustrating the longitudinal, lateral and directional control of the aircraft of the invention.
Figure 9B:
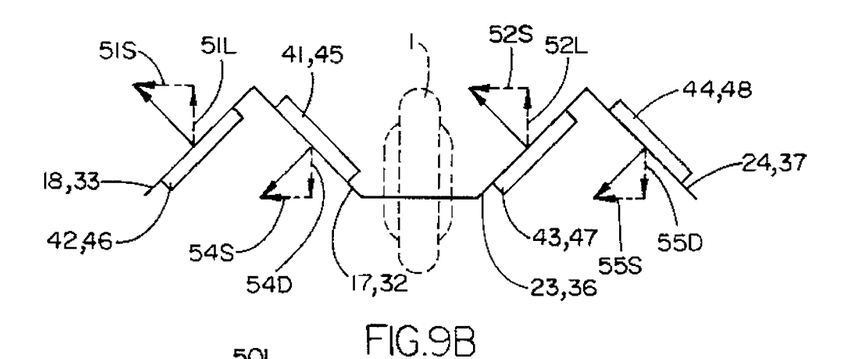
Figures 9C, 10, 11, 12:
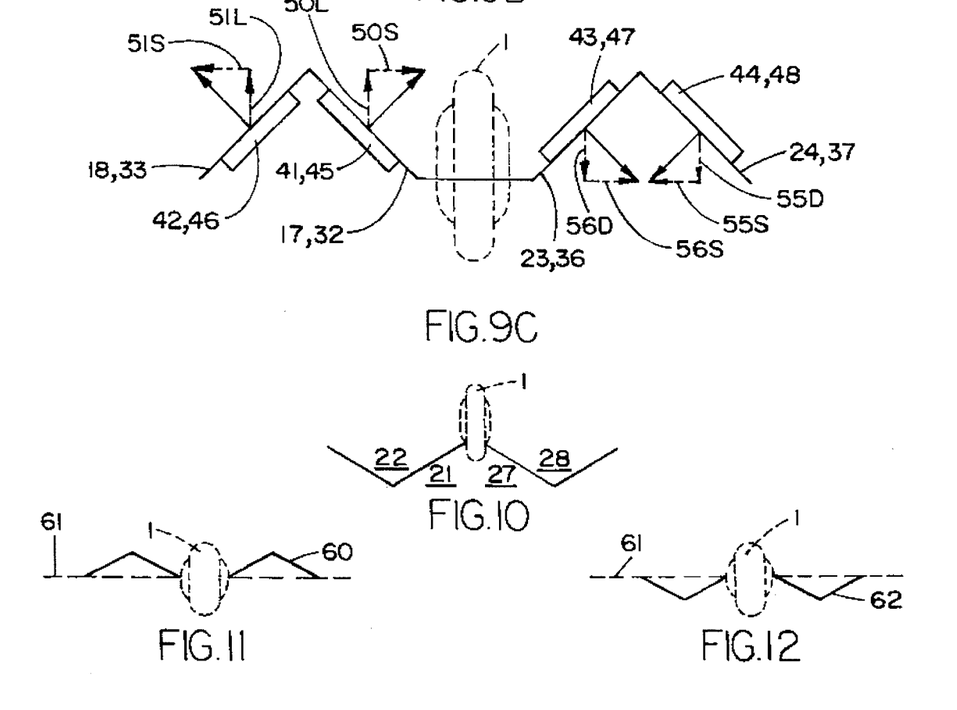
FIG. 10 is a schematic diagram of a modification of the disclosed embodiments of the gull wing aircraft of the invention, in front view.
FIG. 11 is a schematic diagram of a front view of an embodiment of the aircraft of the invention having a gull tail surface.
FIG. 12 is a schematic diagram of a front view of a modification of the embodiment of the gull tail surface aircraft of FIG. 11.

The control means comprise flaps 45', 46', 47' and 48', controlled as illustrated with respect to FIGS. 9A, 9B and 9C, and the tail surface comprises a pair of tail sections 66 extending from opposite sides of the fuselage at an angle with a horizontal plane. Each of the sections 66 is bent intermediate its length to form an inboard Dart 68 and an outboard part 70 in the shape of a substantial "V" and an inverted substantial "V". Both of the inboard parts 68 are bent in substantially the same direction at substantially the same angle, and both of the outboard parts 70 are bent in substantially the same direction at substantially the same angle.

The gull tail surface is formed by forming a pair of tail sections 66, bending each of the sections intermediate its length to form an inboard part 68 and an outboard part 70 in the shape of a substantial "V" and an inverted substantial "V", bending both of the sections in substantially the same direction at substantially the same angle and affixing the sections to opposite sides of the fuselage at an angle with a horizontal plane.

FIG. 9A illustrates the inboard control surfaces or flaps 41 and 43 (FIG. 3) and 45 and 47 (FIG. 7) of the gull wing or gull tail 60 of the invention (FIG. 11) moved down and the outboard control surfaces or flaps 42 and 44 (FIG. 3) and 46 and 48 (FIG. 7) of the gull wing or gull tail 60 of the invention moved down. The flap 41 of the aircraft of FIG. 3 and the flap 45 of the aircraft of FIG. 7 produce lift forces 50L and side forces 50S (FIG. 9A). The flap 42 of the aircraft of FIG. 3 and the flap 46 of the aircraft of FIG. 7 produce lift forces 51L and side forces 51S (FIG. 9A). The flap 43 of the aircraft of FIG. 3 and the flap 47 of the aircraft of FIG. 7 produce lift forces 52L and side forces 52S (FIG. 9A). The flaps 44 of the aircraft of FIG. 3 and the flap 48 of the aircraft of FIG. 7 produce lift forces 53L and side forces 53S (FIG. 9A). As shown in FIG. 9A, the lift forces 50L, 51L, 52L and 53L add and the side forces 50S and 51S cancel and the side forces 52S and 53S cancel, thereby producing pure pitch.

FIG. 9B illustrates the inboard control surfaces or flaps 41 (FIG. 3) and 45 (FIG. 7) of the gull wing or gull tail 60 of the invention moved up, the inboard control surfaces or flaps 43 (FIG. 3) and 47 (FIG. 7) of the gull wing or gull tail 60 of the invention moved down, the outboard control surfaces or flaps 42 (FIG. 3) and 46 (FIG. 7) of the gull wing or gull tail 60 of the invention moved down and the outboard control surfaces or flaps 44 (FIG. 3) and 48 (FIG.7) of the gull wing or gull tail surfaces 60 of the invention moved up. The flap 41 of the aircraft of FIG. 3 and the flap 45 of the aircraft of FIG. 7 produce descent or contralift forces 54D and side forces 54S (FIG. 9B). The flap 42 of the aircraft of FIG.3 and the flap 46 of the aircraft of FIG. 7 produce lift forces 51L and side forces 51S (FIG. 9B). The flap 43 of the aircraft of FIG. 3 and the flap 47 of the aircraft of FIG. 7 produce lift forces 52L and side forces 52S (FIG. 9B). The flap 44 of the aircraft of FIG. 3 and the flap 48 of the aircraft of FIG. 7 produce descent or contralift forces 55D and side forces 55S (FIG. 9B). As shown in FIG. 9B, the lift and descent forces 51L and 54D, respectively, cancel, the lift and descent forces 52L and 55D, respectively, cancel and the side forces 51S, 54S, 52S and 55S add, thereby producing pure yaw.

FIG. 9C illustrates the inboard control surfaces or flaps 41 (FIG. 3) and 45 (FIG. 7) of the gull wing or gull tail surface 60 of the invention moved down, the inboard control surfaces or flaps 43 (FIG. 3) and 47 (FIG. 7) of the gull wing or gull tail surface 60 of the invention moved up, the outboard control surfaces or flaps 42 (FIG. 3) and 46 (FIG. 7) of the gull wing or gull tail surface 60 of the invention moved down and the outboard control surfaces or flaps 44 (FIG. 3) and 48 (FIG. 7) of the gull wing or gull tail surface 60 of the invention moved up. The flap 41 of the aircraft of FIG. 3 and the flap 45 of the aircraft of FIG. 7 produce lift forces 50L and side forces 50S (FIG. 9C). The flap 42 of the aircraft of FIG. 3 and the flap 46 of the aircraft of FIG. 7 produce lift forces 51L and side forces 51S (FIG. 9C). The flap 43 of the aircraft of FIG. 3 and the flap 47 of the aircraft of FIG. 7 produce descent or contralift forces 56D and side forces 56S (FIG. 9C). The flap 44 of the aircraft of FIG. 3 and the flap 48 of the aircraft of FIG. 7 produce descent or contralift forces 55D and side forces 55S (FIG. 9C). As shown in FIG. 9C, the lift forces 50L and 51L add, the descent forces 55D and 56D add, the side forces 50S and 51S cancel and the side forces 55S and 56S cancel, thereby producing pure roll.

The leading edges 6 and 7 of the wing 4 of the aircraft of FIGS. 1 to 4 and the leading edges 10 and 11 of the wing 5 of the aircraft of FIGS. 5 to 8 make an angle C and the leading edges of the canard 40 make an angle D. Each of these angles is with a line perpendicular to the stem to stern axis of the aircraft. As hereinbefore mentioned, the angle of inclination of the wings of the aircraft is A and the angle of declination of the wings of the aircraft of the invention is B, relative to a horizontal plane.

The aircraft of FIGS. 1 to 4 has a wing span WI and a length L, as shown in FIGS. 4 and 2. The aircraft of FIGS. 5 to 8 has a wing span W2 and the same length L, as shown in FIGS. 8 and 6.

Although shown and described in what are believed to be the most practical and preferred embodiments, it is apparent that departures from the specific method and design described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. A vehicle having a fuselage with a forward end and a spaced opposite aft end, said vehicle lacking a vertical stabilizer, said vehicle comprising:
   a. a wing on said fuselage, wherein said wing comprises a pair of wing sections extending from opposite sides of said fuselage at an angle with a horizontal plane;
   b. a gull tail on said fuselage at the aft end of said fuselage, said tail having leading and trailing edges, and wherein said tail comprises a pair of tail sections extending from opposite sides of said fuselage at an angle with a horizontal plane;
   c. each of said wing sections and said tail sections being bent intermediate its length to form an inboard part and an outboard part in the shape of a substantial "V" and an inverted substantial "V", both of said inboard parts being bent in substantially the same direction at substantially the same angle and both of said outboard parts being bent in substantially the same direction at substantially the same angle; and
   d. control means mounted on said tail at the trailing edges thereof for controlling pitch, yaw and roll.

2. A vehicle as claimed in claim 1, wherein the inboard part of each of said wing sections and said tail sections forms a dihedral angle with said fuselage and the outboard part of each of said wing sections and said tail sections forms an anhedral angle with said inboard part.

3. A vehicle as claimed in claim 1, wherein the inboard part of each of said wing sections and said tail sections forms an anhedral angle with said fuselage and the outboard part of each of said wing sections and said tail sections forms a dihedral angle with said inboard part.

4. An aircraft having a fuselage with a forward end and a spaced opposite aft end, said aircraft lacking a vertical stabilizer, said aircraft comprising a gull wing on said fuselage, said wing having leading and trailing edges;

a gull tail on said fuselage at the aft end of said fuselage;

a canard on said fuselage; and ailerons mounted on said wing at the trailing edges thereof for controlling pitch, yaw and roll.

5. A method of controlling a vehicle lacking a vertical stabilizer and having a fuselage with a forward end and a spaced opposite aft end, said method comprising the steps of forming one of a gull wing with trailing edges and a gull tail with trailing edges;

affixing one of said gull wing and said gull tail to said fuselage; and mounting control surfaces on said one of said wing and said tail affixed to said fuselage at the trailing edges thereof for controlling pitch, yaw and roll.

6. A method as claimed in claim 5, wherein said gull wing is formed by forming a pair of wing sections, bending each of said sections intermediate its length to form an inboard part and an outboard pan in the shape of one of a substantial "V" and an inverted substantial "V", bending both of said inboard parts in substantially the same direction at substantially the same angle, bending both of said outboard parts in substantially the same direction at substantially the same angle and affixing said sections to opposite sides of said fuselage at an angle with a horizontal plane and wherein said gull tail is formed by forming a pair of tail sections bending each of said sections intermediate its length to form an inboard pan and an outboard pan in the shape of one of a substantial "V" and an inverted substantial "V", bending both of said sections in substantially the same direction at substantially the same angle and affixing said sections to opposite sides of said fuselage at an angle with a horizontal plane.

7. A method as claimed in claim 6, wherein said control surfaces are mounted by movably mounting a first control surface to said wing at the trailing edge of the inboard part of one of said wing sections, movably mounting a second control surface to said wing at the trailing edge of the outboard part of said one of said wing sections, movably mounting a third control surface to said wing at the trailing edge of the inboard part of the other of said wing sections and movably mounting a fourth control surface to said wing at the trailing edge of the outboard part of said other of said wing sections whereby when said first, second, third and fourth control surfaces are moved down, lift forces produced thereby add and side forces produced thereby cancel, thereby producing pure pitch.

8. A method as claimed in claim 6, wherein said control surfaces are mounted by movably mounting a first control surface to said wing at the trailing edge of the inboard part of one of said wing sections, movably mounting a second control surface to said wing at the trailing edge of the outboard part of said one of said wing sections, movably mounting a third control surface to said wing at the trailing edge of the inboard part of the other of said wing sections and movably mounting a fourth control surface to said wing at the trailing edge of the outboard part of said other of said wing sections whereby when said first and second control surfaces are moved down and said third and fourth control surfaces are moved up, lift forces produced by said first and second control surfaces add, contralift forces produced by said third and fourth control surfaces add and side forces produced by said first, second, third and forth control surfaces cancel, thereby producing pure roll.

9. A method as claimed in claim 6, wherein said control surfaces are mounted by movably mounting a first control surface to said wing at the trailing edge of the inboard part of one of said wing sections, movably mounting a second control surface to said wing at the trailing edge of the outboard part of said one of said wing sections, movably mounting a third control surface to said wing at the trailing edge of the inboard part of the other of said wing sections and movably mounting a fourth control surface to said wing at the trailing edge of the outboard part of said other of said wing sections whereby when said first and fourth control surfaces are moved up and said second and third control surfaces are moved down, side forces produced by said first, second, third and fourth control surfaces add, lift forces produced by said second control surface are cancelled by forces produced by said first control surface and lift forces produced by said third control surface are cancelled by forces produced by said fourth control surface, thereby producing pure yaw.

* * * * *